US006370374B1

(12) United States Patent
Eichinger et al.

(10) Patent No.: US 6,370,374 B1
(45) Date of Patent: Apr. 9, 2002

(54) PERSONAL CHIP CARD FOR A MOBILE RADIO TERMINAL

(75) Inventors: Siegfried Eichinger, Frazer; Frank Barbalace, Exton, both of PA (US)

(73) Assignee: Orga Kartensysteme GmbH, Paderborn (DE)

( * ) Notice: Subject to any disclaimer, the term of this patent is extended or adjusted under 35 U.S.C. 154(b) by 0 days.

(21) Appl. No.: 09/264,820

(22) Filed: Mar. 9, 1999

(30) Foreign Application Priority Data

Apr. 9, 1998 (DE) ......................................... 198 16 084
Apr. 23, 1998 (DE) ......................................... 198 17 895

(51) Int. Cl.$^7$ ............................................... H04H 7/04
(52) U.S. Cl. ...................... 455/411; 455/436; 455/557; 455/558; 455/445
(58) Field of Search ................. 455/432, 411, 455/434, 445, 558, 557, 658

(56) References Cited

U.S. PATENT DOCUMENTS

| 5,497,411 | A | | 3/1996 | Pellerin ........................ 379/59 |
| 5,509,056 | A | * | 4/1996 | Ericsson et al. ............ 379/144 |
| 6,065,673 | A | * | 5/2000 | Kokkila ........................ 235/379 |
| 6,073,005 | A | * | 6/2000 | Raith et al. .................. 455/404 |
| 6,085,081 | A | * | 7/2000 | Leskinen .................... 455/406 |
| 6,092,133 | A | * | 7/2000 | Erola et al. ................. 710/102 |
| 6,104,928 | A | * | 8/2000 | Waugh ........................ 455/445 |
| 6,195,531 | B1 | * | 2/2001 | Aguirre et al. ............. 455/11.1 |

FOREIGN PATENT DOCUMENTS

| DE | 195 42 145 | 5/1997 |
| DE | 196 36 730 | 3/1998 |
| DE | 196 38 314 | 4/1998 |
| EP | 0 865 216 | 9/1998 |
| WO | 97/30561 | 8/1997 |

OTHER PUBLICATIONS

"Um die Welt ohne Geld", PRAXIS, vol. 15, pp. 66–67, 1995 (Abstract).
Schonborn et al., "Calling Card Services—Merkmale und technische Realisierung", Telecom PRAXIS, pp. 17–27, 1997 (No Abstract).
H. Lemme, "Chipkarten: Milliardengeschäft des 21.Jahrhunderts", Elektronik, pp. 42–52, 1996 (Abstract).
IBM, Technical Disclosure Bulletin, "Smart Phone/Calling Card", p. 63, 1997 (Abstract).

* cited by examiner

*Primary Examiner*—Daniel Hunter
*Assistant Examiner*—Alan T. Gantt
(74) *Attorney, Agent, or Firm*—Foley & Lardner

(57) ABSTRACT

A mobile radio telephone terminal for communication (voice and data transmission) via a mobile radio telephone network is described in which at least one access number (A) to a telecommunication network service (e.g., calling card service) and a corresponding personal identification number (B) are stored. The mobile radio telephone terminal provides and transmits the access number (A) and the personal identification number (B) after an already-effected authentication to the mobile radio telephone network for communication establishment.

12 Claims, 3 Drawing Sheets

PERSONAL CHIP CARD FOR A MOBILE RADIO TERMINAL

FIELD OF THE INVENTION

The invention relates to a mobile radio telephone terminal for communication (voice and data transmission) via a mobile radio telephone network by means of a portable data carrier for such mobile radio telephone terminals and to a mobile radio telephone network in which the same are employed.

BACKGROUND OF THE INVENTION

The term "mobile radio telephone network" covers, for example, a mobile radio telephone network in accordance with the GSM, PCS or DCS standard or a satellite supported mobile radio telephone network.

The mobile radio telephone terminal is thereby capable of making a connection with a subscriber within this mobile radio telephone network, with a subscriber of another mobile radio telephone network of the same country, with a subscriber of a conventional telecommunication network of the same country, with a subscriber of a mobile radio telephone network of another country, or with a subscriber of a conventional telecommunication network of another country.

From the field of telecommunications, a so-called calling card service (telecommunication network service) is known wherein the subscriber is connected from a telecommunication terminal (e.g., a public telephone or a hotel telephone) with the calling card service center after dialing a toll-free access number and entering a personal identification number, and, after successful identification and dialing of the desired subscriber's number, is connected via the calling card service center with the number of the desired subscriber. In Germany, for example, a calling card service of said type is offered by Deutsche Telekom AG under the name T-Card Service. The number to be entered by the user in addition to the desired subscriber's number—comprising the toll-free access number+the personal identification number+another personal number (PIN), if required—is very long and requires some concentration during entry because otherwise there is a high probability of an erroneous input.

A first method of billing of the telephone calls made via the calling card service can provide for debiting each completed telephone call against a previously paid amount/balance, whereby in the case of there being no credit remaining no further telephone calls are possible (prepaid method). A second method provides for billing on the basis of a contractual continuous obligation after certain time intervals (e.g., once per month), with no limitation with respect to a maximum amount of charges within said time period (postpaid method).

SUMMARY OF THE INVENTION

The object of the invention is to make calling card services easily available for the users of mobile radio telephone systems.

According to a first aspect of the present invention, there is provided a mobile radio telephone terminal for communication via a mobile radio telephone network, wherein at least one access number to a telecommunication network service and a corresponding personal identification number are stored in the terminal, the terminal providing and transmitting the access number and the personal identification number after authentication to the mobile radio telephone network for communication establishment.

According to a second aspect of the present invention, there is provided a personal chip card for a mobile radio telephone terminal, the chip card serving for authentication of a mobile radio telephone subscriber to a mobile radio telephone network, wherein an identification code of a country and/or a mobile radio telephone network, in whose transmitting and receiving area the mobile radio telephone terminal is located, is storable on the personal chip card, and a data field for storing at least one each country-specific and/or mobile radio telephone network-specific access number to a telecommunication network service is provided in the non-volatile memory of the personal chip card.

According to a third aspect, the personal chip card is characterized in that a data field for storing a part of an access number to a telecommunication network service, which is specific for a calling card service, and a data field for storing two or more country-specific or mobile radio telephone network specific parts of the access number are provided in the non-volatile memory of the personal chip card.

According to a fourth aspect of the present invention, there is provided a mobile radio telephone network for voice and data transmission with a plurality of mobile radio telephone terminals, wherein at least an access number to a telecommunication network service and a corresponding personal identification number are stored in part of the mobile radio telephone terminals, the mobile radio telephone terminal providing and transmitting the access number and the personal identification number for communication establishment after authentication to the mobile radio telephone network.

Additional aspects will be described in the description of the preferred embodiments.

DESCRIPTION OF THE PREFERRED EMBODIMENTS

Figure 1:
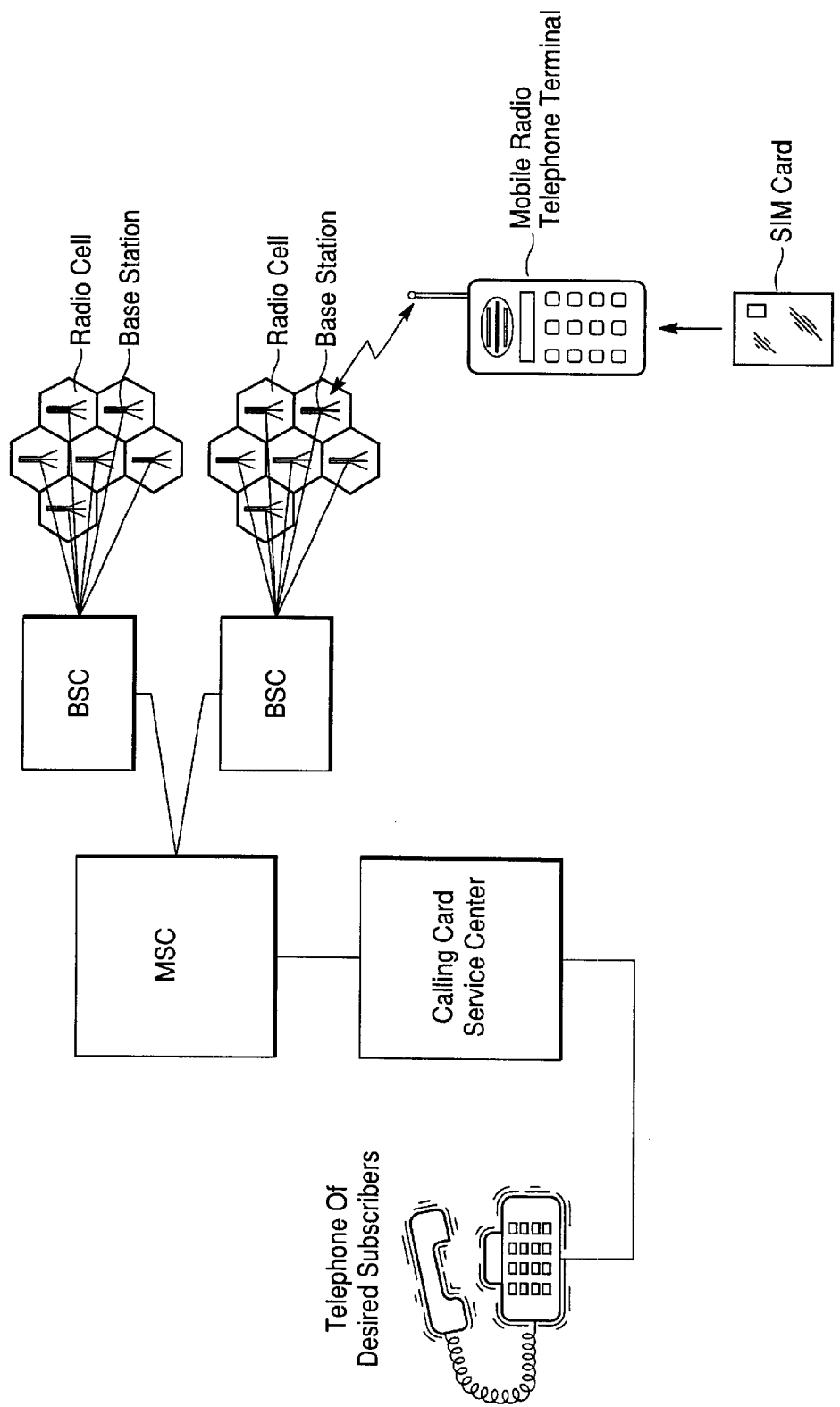
FIG. 1 is a schematic drawing showing a mobile radio telephone network referred to in the present invention.

In the inventive mobile radio telephone terminal for voice and data transmission, at least one access number (A) to a telecommunication network service (e.g., calling card service) and a corresponding personal identification number (B) are stored. The mobile radio telephone terminal then provides and transmits the access number (A) and the personal identification number (B) after the already completed authentication to the mobile radio telephone network. For the user, this signifies a great simplification because it is no longer necessary to enter the very long string of figures. After the user has been identified by the calling card service, he/she enters the desired subscriber number via the keypad of the mobile radio telephone terminal or tells it to an operator of the calling card service, whereupon he/she will be connected with the desired subscriber.

An alternative embodiment of the invention provides for the automatic forming of an overall number for the communication establishment, which comprises the access number (A), the personal identification number (B) and the desired subscriber number, which will then be transmitted (i.e., the user enters the desired number in the conventional manner) and everything else (i.e., the calling card-specific processes) is executed automatically in the background.

The mobile radio telephone terminals are mobile radio telephones or mobile radio telephones in connection with a laptop so that, for example, transmitting and receiving of facsimiles and e-mails is possible.

The "personal" identification number need not necessarily be associated with a natural person (e.g., John Doe) or a legal entity (e.g. Doe & Co., Inc.). In case of a prepaid (prepaid method) calling card service, the personal identification number may also be assigned to an otherwise anonymous balance account.

A particularly advantageous embodiment is realized by mobile radio telephone terminals which are capable of recognizing the country and/or the mobile radio telephone network in whose transmission and receiving area they are currently located and of storing a corresponding identification code (LOCI) for said country and/or mobile radio telephone network. This functionality is given, for example, with mobile radio telephone terminals in accordance with the GSM standard. In an inventive manner two or more country-specific and/or mobile radio telephone network-specific access numbers (A) are stored, with the mobile radio telephone terminal automatically selecting the pertinent access number (A). This is particularly advantageous if a certain calling card service is to be available beyond the borders of a country and/or a mobile radio telephone network, with the generally toll-free access numbers to the calling card service offering from country to country and/or from mobile radio telephone network to mobile radio telephone network. The present prefix for toll-free access numbers in Germany, for example, is 0130, while it is 1800 in the USA. In addition, there are generally several mobile radio telephone networks in one country which may have different access numbers to one and the same calling card service. In Germany, for example, the currently available networks are the C network, the D1, D2 and the E-Plus networks. According to the invention, the user is also relieved of the task of having to look up the valid access number in the respective country and/or mobile radio telephone network each time. The bothersome necessity to carry along "operating instructions" for the calling card service which list the various access numbers is no longer required.

The access number (A) which is stored in the mobile radio telephone terminal can thereby comprise a country-specific and/or mobile radio telephone network-specific part ($A_j$ and/or $A_i$) and of a part ($A_{FIX}$) which is specific to the calling card service and independent of the country and/or the mobile radio telephone network. According to the invention, the access number parts ($A_j$ and/or $A_i$) are stored in the mobile radio telephone terminal for two or more countries and/or mobile radio telephone networks. The mobile radio telephone terminal then automatically selects the pertinent country-specific and/or mobile network-specific part ($A_j$ and/or $A_i$) of the access number (A) as a function of the current identification code (LOCI) from the stored list of the country-specific and/or mobile radio telephone specific access number parts ($A_j$ and/or $A_i$) and completes the access number (A) with the part;

$A=A_i/A_{FIX}$ if the access number contains a country-specific part only; or $A=A_j/A_{FIX}$ if the access number contains a mobile radio telephone network specific part only; or $A=A_i/A_j/A_{FIX}$ if the access number contains a country-specific and a mobile radio telephone network specific part.

In each case, the personal identification number (B) is added to the access number (A), which has been selected and combined in this manner.

If the personal identification number (B) is different for different countries and/or mobile radio telephone networks, these different numbers are also stored inventively in the mobile radio telephone terminal, with the mobile radio telephone terminal selecting the then-valid personal identification number (B) on the basis of the current local identification code (LOCI).

The access number (A) and the personal identification number (B) can be stored in different data fields. It is, however, also provided for combining both to one access string and to store them in one data field. Access string=$A_i/A_{FIX}/B$ According to the invention, two or more country-specific and/or mobile radio telephone network-specific access strings can be stored and selected on the basis of the identification code (LOCI), in this case too.

In an embodiment of the invention it is provided that communication connections can only be established by the mobile radio telephone terminal by activating the access number (A) (i.e., via the calling card service only). In addition, it is provided for the mobile radio telephone terminal to optionally establish connections by activating the access number (A) as well as without exploiting the calling card service, simply by transmitting the desired subscriber number.

In an embodiment of the invention it is provided that the mobile radio telephone terminal comprises a portable data carrier, in particular in the form of a chip card (SIM card; subscriber identification module), on which at least the access number(s) (A), the personal identification number(s) (B) or the identification code(s) (LOCI) are stored.

It is therefore within the scope of the invention to store all these data (access number(s), personal identification number (s), and identification code(s)) on the SIM card only, or to store all these data only in a memory of the mobile radio telephone terminal outside the SIM card, or to store one part of the data on the SIM card and the other part in a memory of the mobile radio telephone terminal outside the SIM card. The identification code (LOCI) is then read out of the respective memory via a corresponding sequence control which comprises its own microprocessor and which is installed in the mobile radio telephone terminal and/or the SIM card, and the corresponding access number is then activated in the respective memory on the basis of the identification code and combined with the personal identification number from the respective memory, or the corresponding access string is selected.

In mobile radio telephone networks in accordance with the GSM standard, a personal chip card (SIM card) for the authentication of the subscriber to the mobile radio telephone network is already used today. Storage of a country-specific and/or mobile radio telephone network-specific identification code (LOCI) is already provided for with these SIM cards.

For the inventive use of the SIM card, a data field is preferably provided in the non-volatile memory (EEPROM) of the SIM card for the storage of at least one country-specific and/or mobile radio telephone network-specific access number (A) to the calling card service. If the access number (A) comprises an invariable part specific to the calling card service ($A_{FIX}$) and country-specific and/or mobile radio telephone network-specific parts ($A_i/A_j$), separate data fields for these are provided on the SIM card.

In addition, a data field for storing the personal, identification number (B) is provided in the non-volatile memory (EEPROM) of the SIM card. If the personal identification number varies from country to country and/or from mobile radio telephone network to mobile radio telephone network, the storage of several country-specific and/or mobile radio telephone network-specific personal identification numbers is also provided for in this data field.

Moreover, the storage of access strings each comprising the access number (A) and the personal identification number (B) is provided in the non-volatile memory (EEPROM) of the SIM card.

A particularly advantageous embodiment of the invention provides for transmitting the access number (A) selected on the basis of the respective current identification code (LOCI) or the selected access string, respectively, into another data field in the non-volatile memory of the SIM card so that the current access number (A) or the current access string, respectively, is always, available (as long as the subscriber stays in said country or mobile radio telephone network).

In addition, the possibility is provided that the data field in which the current access number (A) or the current access string, respectively, is stored is a so-called fixed dialing number directory, with the mobile radio telephone terminal being able to be brought into such a condition that only the numbers in this directory can be selected. Such a directory already exists with GSM SIM cards so that it can be advantageously used for the inventive purpose.

It is also to be mentioned that the invention has the great advantage that in the mobile radio telephone network, an additional prepaid option is created in a simple manner (i.e., in a user-friendly manner) for so-called service providers who have no own mobile radio telephone network operation and have to lease network capacity from the network providers. This is all the more of importance because a prepaid variant is increasingly gaining in significance both for the subscribers within the mobile radio telephone network as well as for the service providers (mobile radio telephone network providers and service providers) for various reasons. For the subscriber to the mobile radio telephone network, the prepaid variant means a kind of self-control because he/she is no longer able to telephone in an uncontrolled manner and to incur costs after the prepaid credit has been used up. For the service provider, the prepaid variant offers security with respect to customers whose credit worthiness is considered poor or has not yet been investigated.

Previously known prepaid options in a mobile radio telephone network are based on so-called prepaid service centers which are directly incorporated in the architecture of the mobile radio telephone network provider so that only mobile radio telephone network providers can offer their customers a prepaid option, but not the service providers in this network. In the case of the known prepaid variant within a mobile radio telephone network, the billing vouchers generated by the mobile radio telephone center (MSC) are submitted to the prepaid service center immediately after a telephone call or also after certain time intervals during a telephone call. The subscriber identifications of the prepaid customers and the current balance are stored in the prepaid service center, with the balance being updated as rapidly as possible in accordance with the billing vouchers. Before each telephone call, a check is carried out by the prepaid center to determine whether credit still remains. Such a prepaid method, however, requires the direct and immediate (after each telephone call or in even shorter time intervals) forwarding of the billing vouchers generated by the mobile radio telephone center. There is, however, no connection of this type between a straightforward service provider and the mobile radio telephone center.

By incorporating a calling card service, a straightforward service provider for mobile radio telephone systems is capable of providing an own prepaid service by connecting calls of prepaid customers only under the condition that they still have a credit balance. A calling card service will be considerably more attractive for the customer due to the greater ease of handling according to the invention.

Another advantage resulting from the invention will be explained below. In mobile radio telephone networks there is the so-called "roaming" feature which means that subscribers of a certain mobile radio telephone network can also communicate in other mobile radio telephone networks, provided, of course, that the respective mobile radio telephone network providers have created the administrative (contractual) and technical (exchange of subscriber identification data; exchange of billing vouchers) conditions. However, not all mobile radio telephone network subscribers are automatically granted the "roaming privilege." The decision as to whether a subscriber is granted the "roaming privilege" also depends on the credit worthiness of said subscriber. Because the previously known prepaid variant in mobile radio telephone systems lacks the technical and administrative conditions for the exchange of data required for "roaming" of subscribers, the prepaid subscribers have up to now been generally excluded from roaming. By incorporating a calling card service, a straightforward service provider for mobile radio telephone systems is capable of offering his prepaid customers roaming in this case, too, by connecting international calls of prepaid customers only if they still have a credit balance.

The invention will be explained with reference to the accompanying drawings. FIG. 1 schematically shows a mobile radio telephone network. A mobile radio telephone network of this type comprises a plurality of honeycomb-shaped arranged overlapping radio cells, in each of which a base station (transmission and receiving station) is arranged for the wireless communication with the mobile radio telephone terminals which are located within this radio cell. Several base stations are in turn connected with a so-called base station controller (BSC), several of which are provided within the mobile radio telephone network. Among other things, these control the switching of the communication from one radio cell to a neighboring radio cell. The individual base station controllers (BSC) in turn are connected with a higher-ranking mobile radio telephone center—the so-called mobile switching center (MSC). This mobile radio telephone center serves, among other things, as an interface between the mobile radio telephone network and a wired telecommunication network. The automatic transmission to the calling card service center is also effected via same, which then transmits the call to the desired subscriber. In the mobile radio telephone network illustrated herein, the subscriber authenticates himself/herself via a chip card (SIM Card) to be inserted into the mobile radio telephone terminal.

Figure 2:
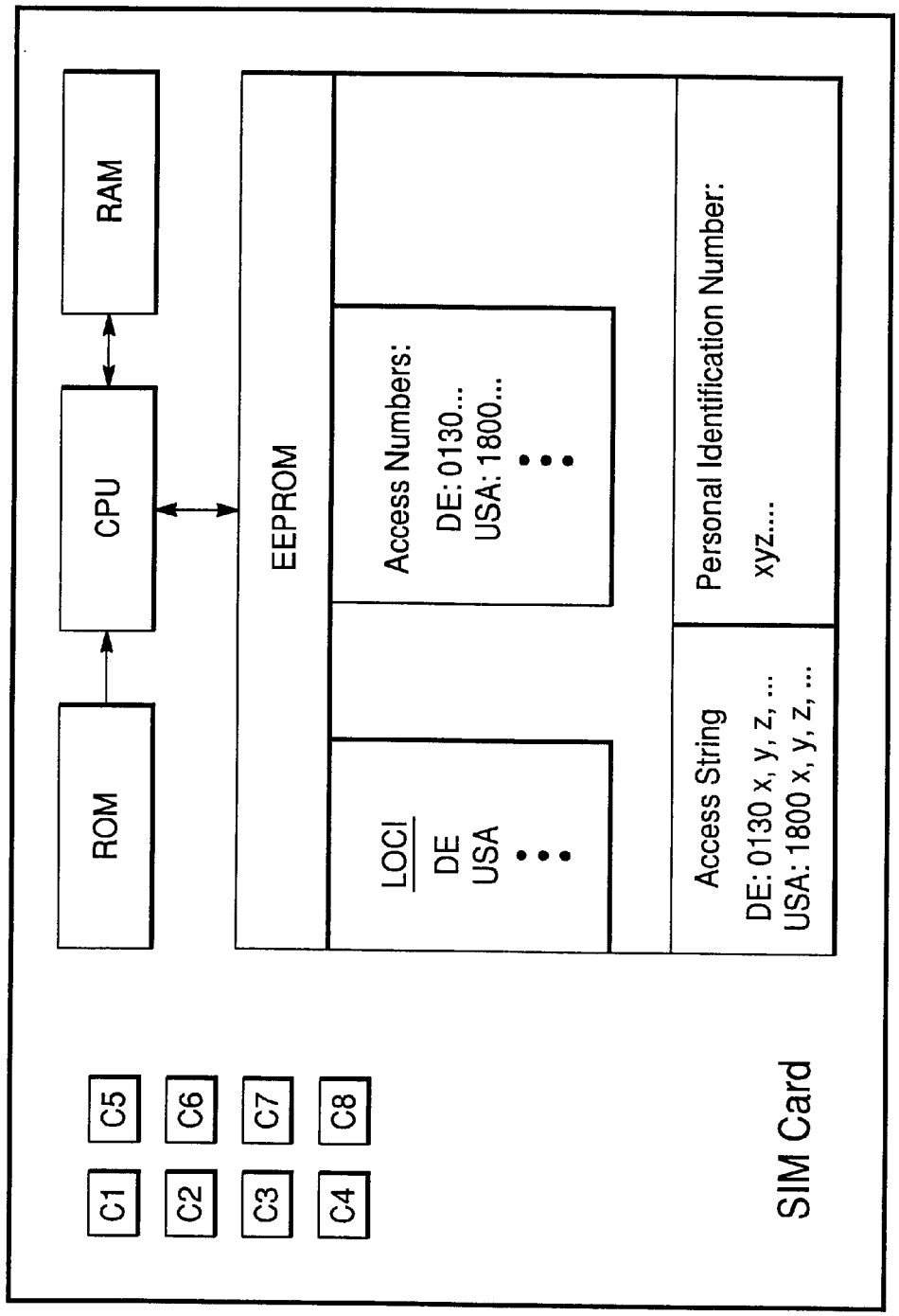
FIG. 2 is a schematic drawing showing the architecture of the personal chip card of the present invention.

FIG. 2 shows the architecture of the SIM card in more detail. The electrical contact surfaces (C1–C8) for the communication via the contacting unit (not shown) with the mobile radio telephone terminal are also depicted. The individual contact surfaces are intended for:

the serial bi-directional data transmission (I/O);
the clock signal (CLK);
the supply voltage (VCC);

the reset signal (RST); and
ground (GND).

The SIM card, a microprocessor card, comprises a central processing unit (CPU). In addition, the chip card (2) has a ROM (read-only memory) in which the operating system is stored, and a non-volatile but overwriteable (programmable) memory (EEPROM—electrically erasable programmable read-only memory). The main memory of the chip card (2) is a volatile RAM (random access memory). The fixed dialing number directory into which the current access data are transmitted in an advantageous manner is also stored in the EEPROM.

According to the invention the country-specific and/or mobile radio telephone network-specific access numbers and the personal identification numbers and the country-specific and/or mobile radio telephone network-specific access strings, as well as the identification code are now stored in the EEPROM.

Programming of the access numbers and the personal identification number is preferably carried out in a so-called personalization step at the card manufacturer or the card issuer. This can, however, also be carried out later when the card is already the property of the subscriber. Programming of only the access numbers could also be performed in a so-called initialization step prior to personalization.

In addition, provision is also made for the subscriber to enter and store the access number and the identification number via the keypad of the mobile radio telephone terminal.

Moreover, the access number and the identification number can be transmitted by means of a so-called "short message," which is known to the GSM expert, via the "over the air" interface to the mobile radio telephone terminal and the SIM card located therein.

Figure 3:
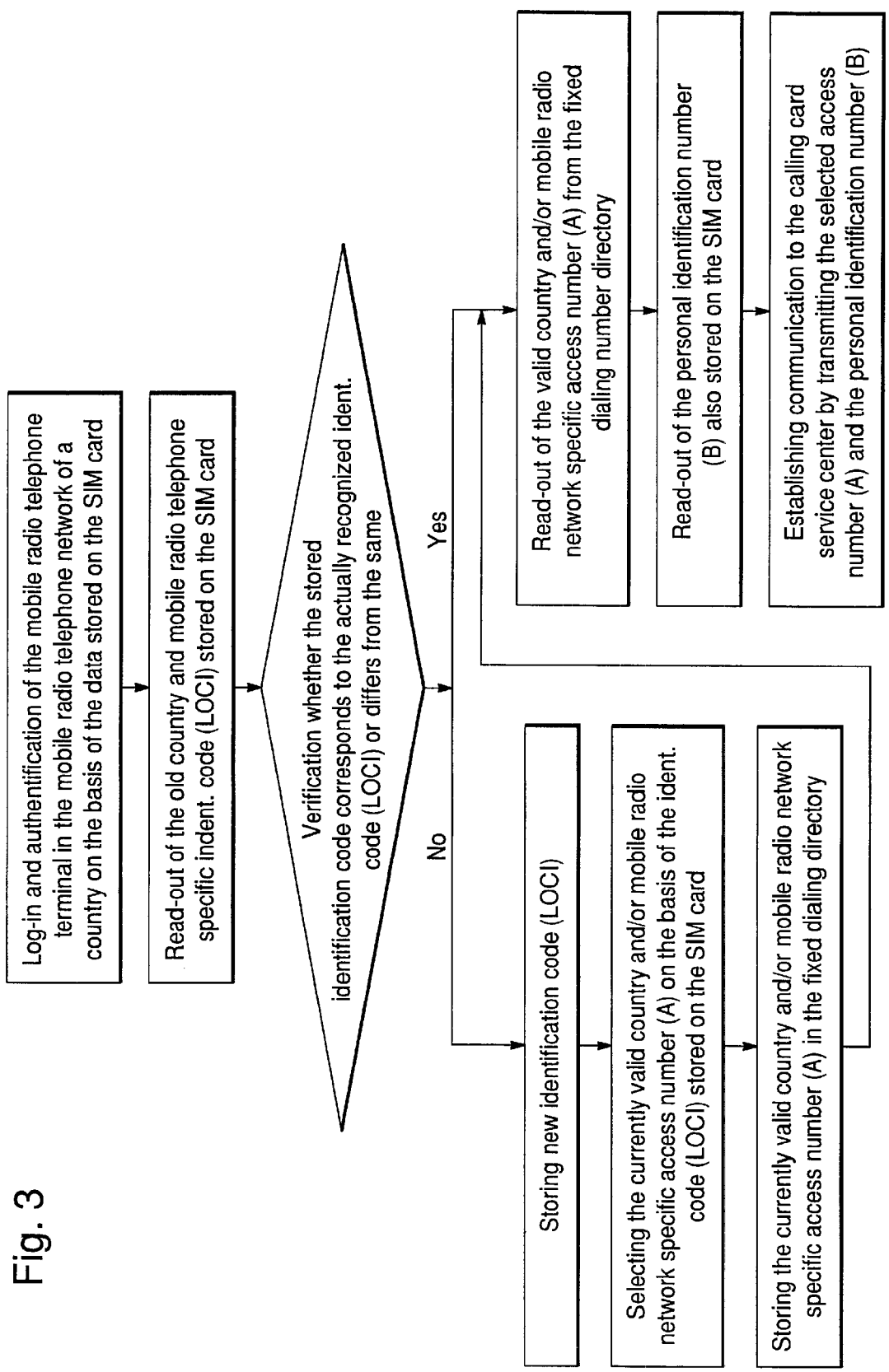
FIG. 3 is flow chart describing the sequence method for utilizing a telecommunication service in a mobile telephone network in accordance with the present invention.

Finally, reference is made to FIG. 3 which describes a sequence method for utilizing a calling card service in a mobile radio telephone network in accordance with the invention. After log-in and authentication of the mobile radio telephone terminal in the network of a country is accomplished on the basis of the data stored on the SIM card, the existing data stored on the SIM card is read out. Next, a decision is made as to whether the stored identification code corresponds to the identification code actually recognized. If so, the valid country and/or network-specific access number (A) are read out from the fixed directory. Next, the personal identification number (B) is read out from the SIM card. Finally, communication with the service center is established by transmitting the selected access number (A) and the personal identification number (B). If the answer to the above decision is negative, then the new identification code (LOCI) is stored and the currently-valid access number (A) is selected based on the current identification code (LOCI). After the selected access number is stored in the fixed dialing directory, the access number and the personal identification numbers are read out as above and communication is established.

What is claimed is:

1. A personal chip card for a mobile radio telephone terminal,
   said chip card serving for authentication of a mobile radio telephone subscriber to a mobile radio telephone network; wherein:
   an identification code of a country and/or a mobile radio telephone network, in whose transmitting and receiving area the mobile radio telephone terminal is located, is stored on said personal chip card; and
   a data field is provided in the non-volatile memory of said personal chip card, said data field storing at least one country-specific and/or mobile radio telephone network-specific access number to a telecommunication network service, and said data field storing one or more country-specific or mobile radio telephone network-specific personal identification number(s),
   said chip card serving for authentication of said mobile radio telephone subscriber independently of a user dialed number.

2. The personal chip card according claim 1,
   wherein a current country-specific and/or mobile radio telephone network-specific access number, access string and/or personal identification number are selected on the basis of the identification code and transferred to another data field of the non-volatile memory of the personal chip card.

3. The personal chip card according to claim 2,
   wherein the data field in which the current access number, access string and/or the personal identification number are stored in a fixed dialing number directory; and
   said mobile radio telephone terminal is capable of being brought into a condition in which only the numbers in this directory can be selected.

4. The personal chip card of claim 1, wherein the mobile radio telephone terminal recognizes the country and/or mobile radio telephone network it is currently located on and automatically selects a current access number on the basis of this recognition.

5. A personal chip card for a mobile radio telephone terminal,
   said chip card serving for authentication of a mobile radio telephone subscriber to a mobile radio telephone network; wherein:
   an identification code of a country and/or the mobile radio telephone network, in whose transmitting and receiving area the mobile radio telephone terminal is located, is stored on said personal chip card; and
   a data field is provided in the non-volatile memory of said personal chip card, said data field storing two or more country-specific and/or mobile radio telephone network-specific parts of an access number to a telecommunication service and said data field storing two or more country-specific and/or mobile radio telephone network-specific personal identification number(s), said access number being specific for said telecommunication service,
   said chip card serving for authentication of said mobile radio telephone subscriber independently of a user dialed number.

6. The personal chip card according claim 5,
   wherein a current country-specific and/or mobile radio telephone network-specific access number, access string and/or personal identification number are selected on the basis of the identification code and transferred to another data field of the non-volatile memory of the personal chip card.

7. The personal chip card according to claim 6,
   wherein the data field in which the current access number, access string and/or the personal identification number are stored in a fixed dialing number directory; and
   said mobile radio telephone terminal is capable of being brought into a condition in which only the numbers in this directory can be selected.

8. A personal chip card for a mobile radio telephone terminal,
   said chip card serving for authentication of a mobile radio telephone subscriber to a mobile radio telephone network;

wherein an identification code of a country and/or the mobile radio telephone network, in whose transmitting and receiving area the mobile radio telephone terminal is located, is stored on said personal chip card;

a data field is provided in the non-volatile memory of said personal chip card, said data field storing one or several country-specific or mobile radio telephone network-specific access string(s), said access string comprising an access number to a telecommunication service and a corresponding country-specific or mobile radio telephone network specific personal identification number(s), said chip card serving for authentication of said mobile radio telephone subscriber independently of a user dialed number.

9. The personal chip card according claim 8, wherein a current country-specific and/or mobile radio telephone network-specific access number, access string and/or personal identification number are selected on the basis of the identification code and transferred to another data field of the non-volatile memory of the personal chip card.

10. The personal chip card according to claim 6, wherein the data field in which the current access number, access string and/or the personal identification number are stored in a fixed dialing number directory; and said mobile radio telephone terminal is capable of being brought into a condition in which only the numbers in this directory can be selected.

11. A method of placing a call with a chip card on a mobile radio telephone comprising the steps of:

providing a user entered subscriber number;

recognizing the country and/or mobile radio telephone network said mobile radio telephone is currently located on independently of the user entered subscriber number;

automatically selecting a current access number stored on said chip card on the basis of said recognition; and transmitting said current access number and said user entered subscriber number.

12. The method of claim 11, further comprising the step of: storing one or several country-specific or mobile radio telephone network-specific personal identification number (s) in the non-volatile memory of the chip card.

* * * * *